United States Patent
Kim

(10) Patent No.: US 8,648,877 B2
(45) Date of Patent: Feb. 11, 2014

(54) MOBILE TERMINAL AND OPERATION METHOD THEREOF

(75) Inventor: Bumbae Kim, Changwon-si (KR)

(73) Assignee: LG Electronics Inc., Seoul (KR)

( * ) Notice: Subject to any disclaimer, the term of this patent is extended or adjusted under 35 U.S.C. 154(b) by 376 days.

(21) Appl. No.: 13/016,137

(22) Filed: Jan. 28, 2011

(65) Prior Publication Data

US 2011/0273473 A1    Nov. 10, 2011

(30) Foreign Application Priority Data

May 6, 2010 (KR) ........................ 10-2010-0042619

(51) Int. Cl.
*G09G 5/00* (2006.01)

(52) U.S. Cl.
USPC ........................... 345/629; 345/581; 345/619

(58) Field of Classification Search
None
See application file for complete search history.

(56) References Cited

U.S. PATENT DOCUMENTS

| | | | |
|---|---|---|---|
| 5,631,970 A * | 5/1997 | Hsu ............................... | 382/113 |
| 6,121,960 A * | 9/2000 | Carroll et al. ................. | 345/173 |
| 2005/0175253 A1 * | 8/2005 | Li et al. ......................... | 382/260 |
| 2006/0001757 A1 * | 1/2006 | Sawachi ..................... | 348/333.12 |
| 2008/0186379 A1 * | 8/2008 | Ishigame et al. .............. | 348/116 |
| 2008/0291221 A1 * | 11/2008 | Yamada et al. ................ | 345/660 |
| 2009/0167919 A1 * | 7/2009 | Anttila et al. ............ | 348/333.02 |
| 2010/0001961 A1 * | 1/2010 | Dieterle et al. ............... | 345/173 |
| 2010/0020221 A1 * | 1/2010 | Tupman et al. .......... | 348/333.01 |
| 2010/0226539 A1 * | 9/2010 | Ishii .............................. | 382/104 |
| 2010/0302179 A1 * | 12/2010 | Ahn et al. ..................... | 345/173 |
| 2011/0199479 A1 * | 8/2011 | Waldman ...................... | 348/116 |

FOREIGN PATENT DOCUMENTS

| | | |
|---|---|---|
| CN | 101619976 A | 1/2010 |
| JP | 2007310888 A * | 11/2007 |

* cited by examiner

*Primary Examiner* — Jwalant Amin
(74) *Attorney, Agent, or Firm* — Birch, Stewart, Kolasch & Birch, LLP

(57) ABSTRACT

A mobile terminal and an operating method thereof are provided. The operating method includes displaying a preview image provided by a camera module on a display module; obtaining position information of the mobile terminal; obtaining a map of an area displayed in the preview image and its relevant areas based on the obtained position information; and displaying an image into which the preview image and the map are combined on the display module. Therefore, it is possible for a user to view a preview image and a map at the same time and determine his or her location with an enhanced sense of reality.

21 Claims, 10 Drawing Sheets

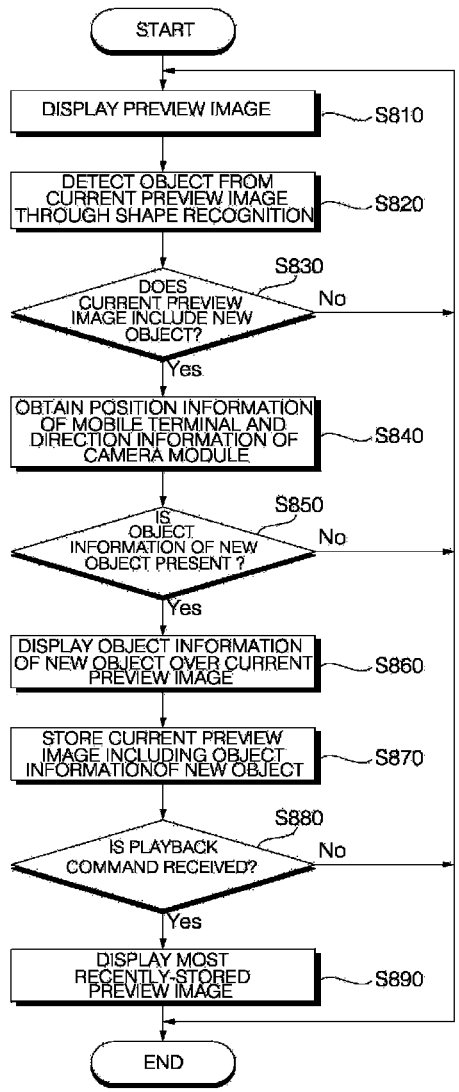

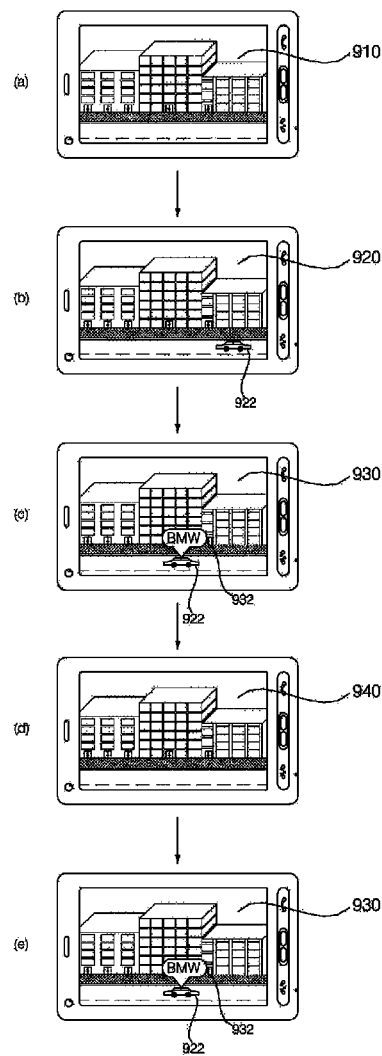

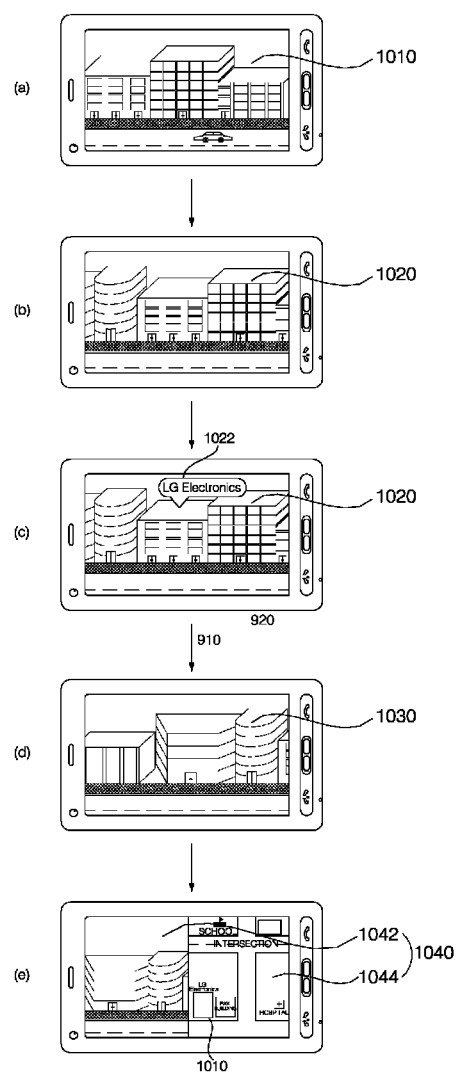

US 8,648,877 B2

MOBILE TERMINAL AND OPERATION METHOD THEREOF

CROSS-REFERENCE TO RELATED APPLICATION

This application claims the priority benefit of Korean Patent Application No. 10-2010-0042619, filed on May 6, 2010, in the Korean Intellectual Property Office, the disclosure of which is incorporated herein by reference.

BACKGROUND OF THE INVENTION

1. Field of the Invention

The present invention relates to a mobile terminal and an operating method thereof, and more particularly, to a mobile terminal capable of realizing augmented reality and an operating method of the mobile terminal.

2. Description of the Related Art

Mobile terminals are portable devices capable of performing voice/video calls, inputting and outputting information, and/or storing data. As the functions of mobile terminals diversify, an increasing number of mobile terminals have been equipped with various complicated functions, such as capturing photos and moving images, playing music files and moving image files, providing games, receiving broadcast programs, and providing wireless Internet services, and have thus evolved into multifunctional multimedia players.

Most mobile terminals are equipped with cameras and are thus being used to capture photos or videos. With the help of advanced mobile camera technology, various techniques, called augmented reality techniques, have been developed for providing a view of a physical real-world environment together with additional information regarding the real-world view.

Augmented reality is a term for the mixture of a view of reality and additional information. Augmented reality techniques can allow users to easily obtain information regarding their surroundings with an enhanced sense of reality.

A method is needed to provide various useful information to users through augmented reality.

SUMMARY OF THE INVENTION

The present invention provides realizing augmented reality, and particularly, a mobile terminal capable of providing map information of an area within a preview image or providing an augmented reality view of the reality at a previous time and an operating method of the mobile terminal.

According to an aspect of the present invention, there is provided an operating method of a mobile terminal, the operating method including displaying a preview image provided by a camera module on a display module; obtaining position information of the mobile terminal; obtaining a map of an area relevant to an area displayed in the preview image based on the obtained position information; and displaying an image into which the preview image and the map are combined on the display module.

According to another aspect of the present invention, there is provided an operating method of a mobile terminal, the operating method including displaying a preview image provided by a camera module on a display module; obtaining a map of an area relevant to an area displayed in the preview; and displaying an image into which the preview image and the map are combined on the display module.

According to another aspect of the present invention, there is provided a mobile terminal including a camera module; a touch screen configured to display a preview image provided by the camera module and receive a user command; a wireless communication unit configured to communicate with an external device; and a controller configured to obtain position information of the mobile terminal via the wireless communication unit, obtain a map of an area relevant to an area displayed in the preview image based on the obtained position information of the mobile terminal, and display an image into which the preview image and the map are combined.

BRIEF DESCRIPTION OF THE DRAWINGS

The above and other features and advantages of the present invention will become more apparent by describing in detail preferred embodiments thereof with reference to the attached drawings in which:

FIG. 8 illustrates a flowchart of an operating method of a mobile terminal, according to another exemplary embodiment of the present invention;

FIG. 9 illustrates diagrams for explaining how to provide an augmented reality view of the reality at a previous time; and FIG. 10 illustrates diagrams for explaining how to combine an augmented reality view of the reality at a previous time and an augmented reality map.

DETAILED DESCRIPTION OF THE INVENTION

The present invention will hereinafter be described in detail with reference to the accompanying drawings in which exemplary embodiments of the invention are shown.

The term 'mobile terminal', as used herein, may indicate a mobile phone, a smart phone, a laptop computer, a digital broadcast receiver, a personal digital assistant (PDA), a portable multimedia player (PMP), or a navigation device. In this disclosure, the terms 'module' and 'unit' can be used interchangeably.

Figure 1:
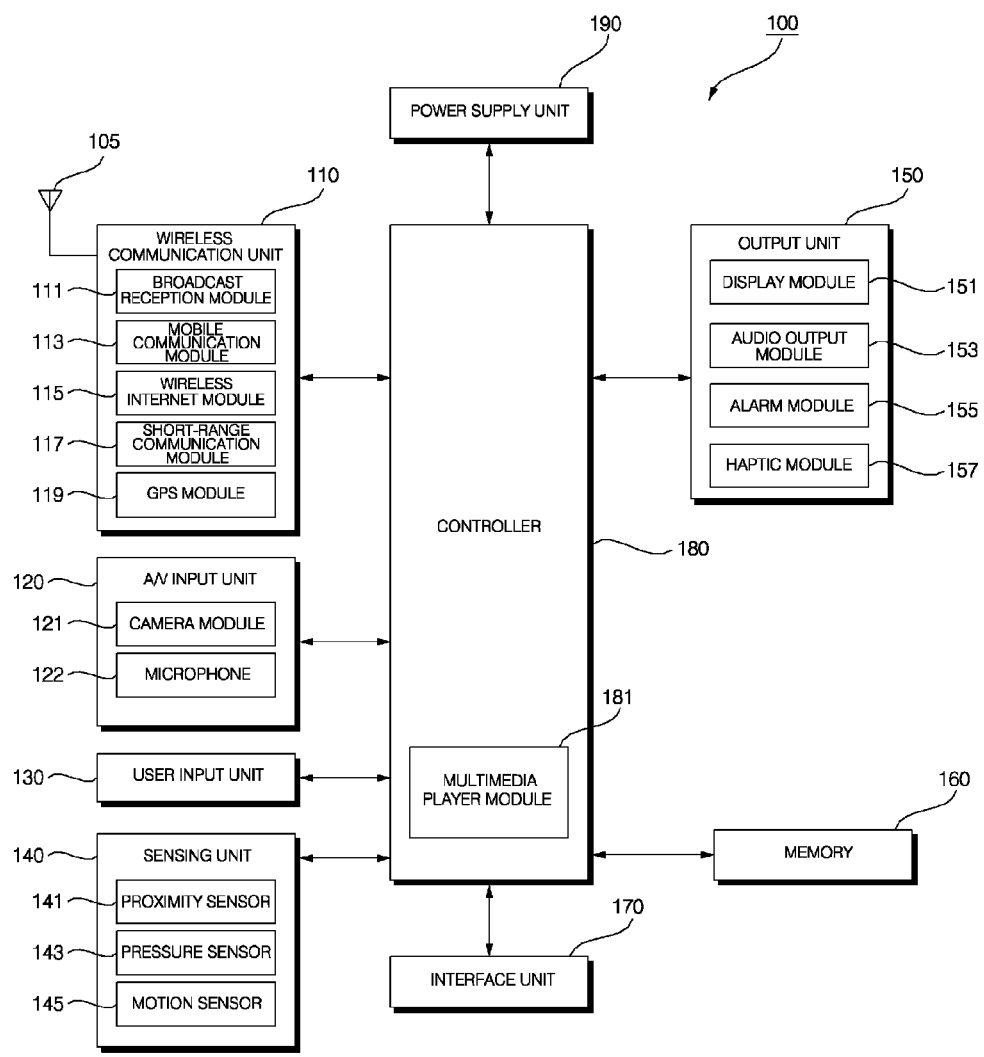
FIG. 1 illustrates a block diagram of a mobile terminal according to an exemplary embodiment of the present invention.

FIG. 1 illustrates a block diagram of a mobile terminal 100 according to an embodiment of the present invention. Referring to FIG. 1, the mobile terminal 100 may include a wireless communication unit 110, an audio/video (A/V) input unit 120, a user input unit 130, a sensing unit 140, an output unit 150, a memory 160, an interface unit 170, a controller 180, and a power supply unit 190. Here, when the above constituent elements are implemented, two or more of the constituent elements may be combined into one constituent element, or one constituent element may be divided into two or more constituent elements, if appropriate.

The wireless communication unit 110 may include a broadcast reception module 111, a mobile communication module 113, a wireless internet module 115, a short-range communication module 117, and a global positioning system (GPS) module 119.

The broadcast reception module 111 may receive broadcast signals and/or broadcast-related information from an external broadcast management server through a broadcast channel. The broadcast channel may be a satellite channel or a terrestrial channel. The broadcast management server may be a server which generates broadcast signals and/or broadcast-related information and transmits the generated broadcast signals and/or the generated broadcast-related information or may be a server which receives and then transmits previously-generated broadcast signals and/or previously-generated broadcast-related information.

The broadcast-related information may include broadcast channel information, broadcast program information and/or broadcast service provider information. The broadcast signals may include a TV broadcast signal, a radio broadcast signal, a data broadcast signal, the combination of a data broadcast signal and a TV broadcast signal or the combination of a data broadcast signal and a radio broadcast signal. The broadcast-related information may be provided to the mobile terminal 100 through a mobile communication network. In this case, the broadcast-related information may be received by the mobile communication module 113, rather than by the broadcast reception module 111.

The broadcast reception module 111 may receive broadcast signals using various broadcasting systems. In particular, the broadcast reception module 111 may receive digital broadcast signals using various digital broadcasting systems. In addition, the broadcast reception module 111 may be suitable not only for digital broadcasting systems but also for nearly all types of broadcasting systems other than digital broadcasting systems. The broadcast signal or the broadcast-related information received by the broadcast reception module 111 may be stored in the memory 160.

The mobile communication module 113 may transmit wireless signals to or receives wireless signals from at least one of a base station, an external terminal, and a server through a mobile communication network. The wireless signals may include various types of data according to whether the mobile terminal 100 transmits/receives voice call signals, video call signals, or text/multimedia messages.

The wireless internet module 115 may be a module for wirelessly accessing the internet. The wireless internet module 115 may be embedded in the mobile terminal 100 or may be installed in an external device. The wireless internet module 115 may be embedded in the mobile terminal 100 or may be installed in an external device. The wireless internet module 115 may use various wireless internet technologies such as wireless local area network (WLAN), Wireless Broadband (WiBro), World Interoperability for Microwave Access (Wimax), and High Speed Downlink Packet Access (HSDPA).

The short-range communication module 117 may be a module for short-range communication. The short-range communication module 117 may use various short-range communication techniques such as Bluetooth, radio frequency identification (RFID), infrared data association (IrDA), ultra wideband (UWB), and ZigBee.

The GPS module 119 may receive position information from a plurality of GPS satellites.

The A/V input unit 120 may be used to receive audio signals or video signals. The A/V input unit 120 may include a camera module 121 and a microphone 123. The camera module 121 may process various image frames such as still images or moving images captured by an image sensor during a video call mode or an image capturing mode. The image frames processed by the camera module 121 may be displayed by a display module 151.

The image frames processed by the camera module 121 may be stored in the memory 160 or may be transmitted to an external device through the wireless communication unit 110. The mobile terminal 100 may include two or more cameras 121.

The microphone 123 may receive external audio signals during a call mode, a recording mode, or a voice recognition mode and may convert the received sound signals into electrical audio data. During the call mode, the mobile communication module 113 may convert the electrical sound data into data that can be readily transmitted to a mobile communication base station, and may then output the data obtained by the conversion. The microphone 123 may use various noise removal algorithms to remove noise that may be generated during the reception of external sound signals.

The user input unit 130 may generate key input data based on user input for controlling the operation of the mobile terminal 100. The user input unit 130 may be implemented as a keypad, a dome switch, or a static pressure or capacitive touch pad which is capable of receiving a command or information by being pushed or touched by a user. Alternatively, the user input unit 130 may be implemented as a wheel, a jog dial or wheel, or a joystick capable of receiving a command or information by being rotated. Still alternatively, the user input unit 130 may be implemented as a finger mouse. In particular, if the user input unit 130 is implemented as a touch pad and forms a mutual layer structure with the display module 151, the user input unit 130 and the display module 151 may be collectively referred to as a touch screen.

The sensing unit 140 may determine a current state of the mobile terminal 100 such as whether the mobile terminal 100 is opened or closed, the position of the mobile terminal 100 and whether the mobile terminal 100 is placed in contact with the user, and may generate a sensing signal for controlling the operation of the mobile terminal 100. For example, when the mobile terminal 100 is a slider-type mobile phone, the sensing unit 140 may determine whether the mobile terminal 100 is opened or closed. In addition, the sensing unit 140 may determine whether the mobile terminal 100 is powered by the power supply unit 190 and whether the interface unit 170 is connected to an external device.

The sensing unit 140 may include a proximity sensor 141, a pressure sensor 143 and a motion sensor 145. The proximity sensor 141 may detect an approaching object or whether there is an object nearby the mobile terminal 100 without mechanical contact. More specifically, the proximity sensor 141 may detect an approaching object based on a change in an alternating current (AC) magnetic field or a static magnetic field, or the rate of change of capacitance. The sensing unit 140 may include two or more detection sensors 141.

The pressure sensor 143 may determine whether pressure is being applied to the mobile terminal 100 or may measure the magnitude of pressure, if any, applied to the mobile terminal 100. The pressure sensor 143 may be installed in a certain part of the mobile terminal 100 where the detection of pressure is necessary. For example, the pressure sensor 143 may be installed in the display module 151. In this case, it is possible to differentiate a typical touch input from a pressure touch input, which is generated by applying greater pressure than that used to generate a typical touch input, based on a signal output by the pressure sensor 143. In addition, it is possible to determine the magnitude of pressure applied to the display module 151 upon receiving a pressure touch input based on the signal output by the pressure sensor 143.

The motion sensor 145 may determine the location and motion of the mobile terminal 100 using an acceleration sensor or a gyro sensor.

In the meantime, acceleration sensors are a type of device for converting a vibration in acceleration into an electric signal. With recent developments in micro-electromechanical system (MEMS) technology, acceleration sensors have been widely used in various products for various purposes ranging from detecting large motions such as car collisions as performed in airbag systems for automobiles to detecting minute motions such as the motion of the hand as performed in gaming input devices. In general, two or more acceleration sensors representing different axial directions are incorporated into a single package. There are some cases when the detection of only one axial direction, for example, a Z-axis direction, is necessary. Thus, when an X- or Y-axis acceleration sensor, instead of a Z-axis acceleration sensor, is required, the X- or Y-axis acceleration sensor may be mounted on an additional substrate, and the additional substrate may be mounted on a main substrate.

Gyro sensors are sensors for measuring angular velocity, and may determine the relative direction of the rotation of the mobile terminal 100 to a reference direction.

The output unit 150 may output audio signals, video signals and alarm signals. The output unit 150 may include the display module 151, an audio output module 153, an alarm module 155, and a haptic module 157.

The display module 151 may display various information processed by the mobile terminal 100. For example, if the mobile terminal 100 is in a call mode, the display module 151 may display a user interface (UI) or a graphic user interface (GUI) for making or receiving a call. If the mobile terminal 100 is in a video call mode or an image capturing mode, the display module 151 may display a UI or a GUI for capturing or receiving images.

If the display module 151 and the user input unit 130 form a mutual layer structure and are thus implemented as a touch screen, the display module 151 may be used not only as an output device but also as an input device capable of receiving information by being touched by the user.

If the display module 151 is implemented as a touch screen, the display module 151 may also include a touch screen panel and a touch screen panel controller. The touch screen panel is a transparent panel attached onto the exterior of the mobile terminal 100 and may be connected to an internal bus of the mobile terminal 100. The touch screen panel keeps monitoring whether the touch screen panel is being touched by the user. Once a touch input to the touch screen panel is received, the touch screen panel transmits a number of signals corresponding to the touch input to the touch screen panel controller. The touch screen panel controller processes the signals transmitted by the touch screen panel, and transmits the processed signals to the controller 180. Then, the controller 180 determines whether a touch input has been generated and which part of the touch screen panel has been touched based on the processed signals transmitted by the touch screen panel controller.

The display module 151 may include electronic paper (e-paper). E-paper is a type of reflective display technology and can provide as high resolution as ordinary ink on paper, wide viewing angles, and excellent visual properties. E-paper can be implemented on various types of substrates such as a plastic, metallic or paper substrate and can display and maintain an image thereon even after power is cut off. In addition, e-paper can reduce the power consumption of the mobile terminal 100 because it does not require a backlight assembly. The display module 151 may be implemented as e-paper by using electrostatic-charged hemispherical twist balls, using electrophoretic deposition, or using microcapsules.

The display module 151 may include at least one of a liquid crystal display (LCD), a thin film transistor (TFT)-LCD, an organic light-emitting diode (OLED), a flexible display, and a three-dimensional (3D) display. The mobile terminal 100 may include two or more display modules 151. For example, the mobile terminal 100 may include an external display module (not shown) and an internal display module (not shown).

The audio output module 153 may output audio data received by the wireless communication unit 110 during a call reception mode, a call mode, a recording mode, a voice recognition mode, or a broadcast reception mode or may output audio data present in the memory 160. In addition, the audio output module 153 may output various sound signals associated with the functions of the mobile terminal 100 such as receiving a call or a message. The audio output module 153 may include a speaker and a buzzer.

The alarm module 155 may output an alarm signal indicating the occurrence of an event in the mobile terminal 100. Examples of the event include receiving a call signal, receiving a message, and receiving a key signal. Examples of the alarm signal output by the alarm module 155 include an audio signal, a video signal and a vibration signal. More specifically, the alarm module 155 may output an alarm signal upon receiving an incoming call or message. In addition, the alarm module 155 may receive a key signal and may output an alarm signal as feedback to the key signal. Therefore, the user may be able to easily recognize the occurrence of an event based on an alarm signal output by the alarm module 155. An alarm signal for notifying the user of the occurrence of an event may be output not only by the alarm module 155 but also by the display module 151 or the audio output module 153.

The haptic module 157 may provide various haptic effects (such as vibration) that can be perceived by the user. If the haptic module 157 generates vibration as a haptic effect, the intensity and the pattern of vibration generated by the haptic module 157 may be altered in various manners. The haptic module 157 may synthesize different vibration effects and may output the result of the synthesization. Alternatively, the haptic module 157 may sequentially output different vibration effects.

The haptic module 157 may provide various haptic effects, other than vibration, such as a haptic effect obtained using a pin array that moves perpendicularly to a contact skin surface, a haptic effect obtained by injecting or sucking in air through an injection hole or a suction hole, a haptic effect obtained by giving a stimulus to the surface of the skin, a haptic effect obtained through contact with an electrode, a haptic effect obtained using an electrostatic force, and a haptic effect obtained by realizing the sense of heat or cold using a device capable of absorbing heat or generating heat. The haptic module 157 may be configured to enable the user to recognize a haptic effect using the kinesthetic sense of the fingers or the arms. The mobile terminal 100 may include two or more haptic modules 157.

The memory 160 may store various programs necessary for the operation of the controller 180. In addition, the memory 160 may temporarily store various data such as a list of contacts, messages, still images, or moving images.

The memory 160 may include at least one of a flash memory type storage medium, a hard disk type storage medium, a multimedia card micro type storage medium, a card type memory (e.g., a secure digital (SD) or extreme digital (XD) memory), a random access memory (RAM), and a read-only memory (ROM). The mobile terminal 100 may operate a web storage, which performs the functions of the memory 160 on the internet.

The interface unit 170 may interface with an external device that can be connected to the mobile terminal 100. The interface unit 170 may be a wired/wireless headset, an external battery charger, a wired/wireless data port, a card socket for, for example, a memory card, a subscriber identification module (SIM) card or a user identity module (UIM) card, an audio input/output (I/O) terminal, a video I/O terminal, or an earphone. The interface unit 170 may receive data from an external device or may be powered by an external device. The interface unit 170 may transmit data provided by an external device to other components in the mobile terminal 100 or may transmit data provided by other components in the mobile terminal 100 to an external device.

When the mobile terminal 100 is connected to an external cradle, the interface unit 170 may provide a path for supplying power from the external cradle to the mobile terminal 100 or for transmitting various signals from the external cradle to the mobile terminal 100.

The controller 180 may control the general operation of the mobile terminal 100. For example, the controller 180 may perform various control operations regarding making/receiving a voice call, transmitting/receiving data, or making/receiving a video call. The controller 180 may include a multimedia player module 181, which plays multimedia data. The multimedia player module 181 may be implemented as a hardware device and may be installed in the controller 180. Alternatively, the multimedia player module 181 may be implemented as a software program.

The power supply unit 190 may be supplied with power by an external power source or an internal power source and may supply power to the other components in the mobile terminal 100.

The mobile terminal 100 may include a wired/wireless communication system or a satellite communication system and may thus be able to operate in a communication system capable of transmitting data in units of frames or packets.

The exterior structure of the mobile terminal 100 will hereinafter be described in detail with reference to FIGS. 2 and 3. The present invention can be applied to nearly all types of mobile terminals such as a folder-type, a bar-type, a swing-type and a slider-type mobile terminal. However, for convenience, it is assumed that the mobile terminal 100 is a bar-type mobile terminal equipped with a full touch screen.

Figure 2:
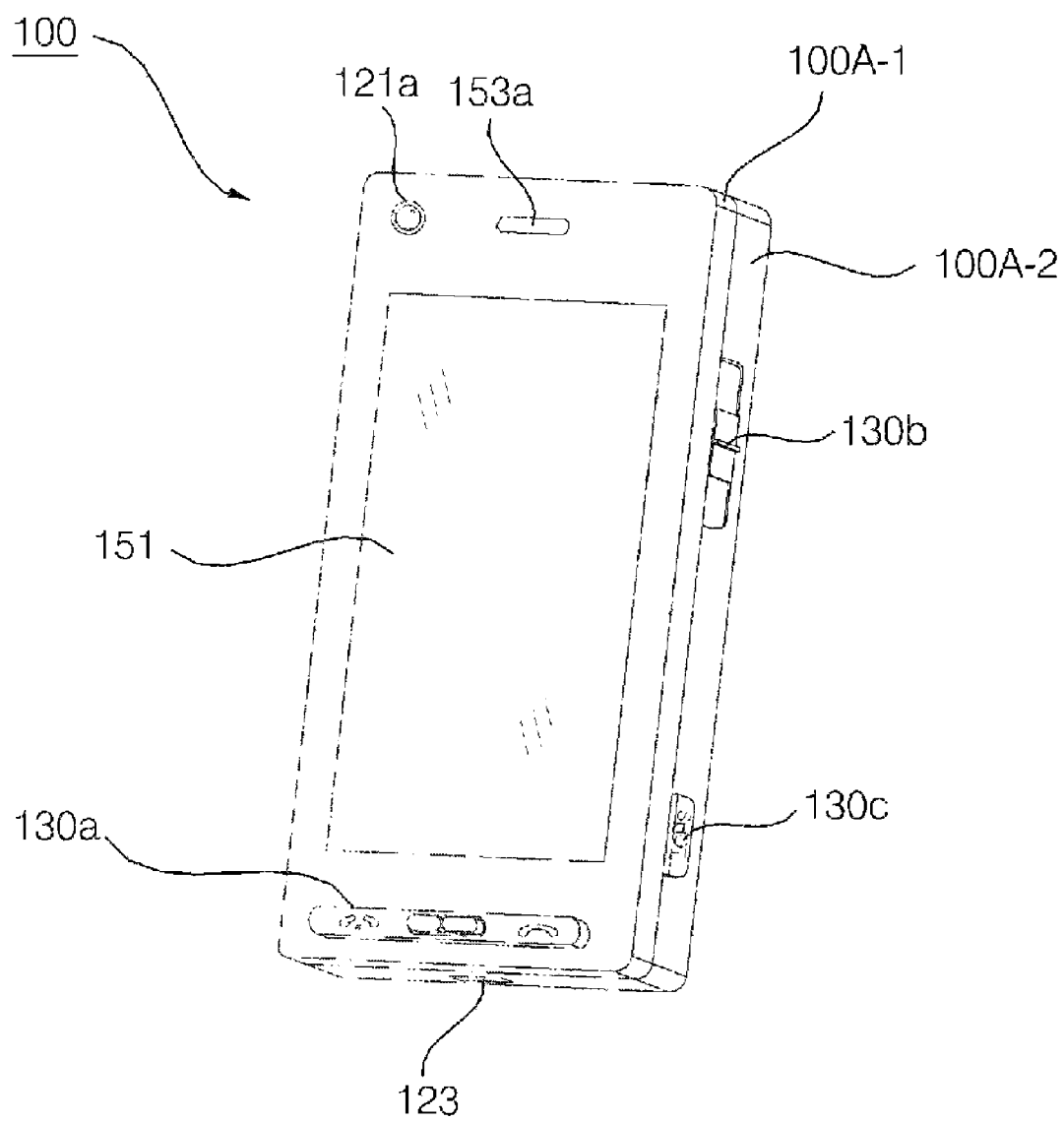
FIG. 2 illustrates a front perspective view of the mobile terminal shown in FIG. 1.

FIG. 2 illustrates a front perspective view of the mobile terminal 100. Referring to FIG. 2, the exterior of the mobile terminal 100 may be formed by a front case 100A-1 and a rear case 100A-2. Various electronic devices may be installed in the space formed by the front case 100A-1 and the rear case 100A-2. At least one middle case (not shown) may be additionally provided between the front case 100A-1 and the rear case 100A-2. The front case 100A-1, the rear case 100A-2 and the middle case(s) may be formed of a synthetic resin through injection molding. Alternatively, the front case 100A-1 and the rear case 100A-2 may be formed of a metal such as stainless steel (STS) or titanium (Ti).

The display module 151, a first audio output module 153*a*, a first camera 121*a*, and a first user input module 130*a* may be disposed in the main body of the mobile terminal 100, and particularly, in the front case 100A-1. Second and third user input modules 130*b* and 130*c* and the microphone 123 may be disposed on one side of the rear case 100A-2.

The display module 151 may include an LCD or OLED that can visualize information. If a touch pad is configured to overlap the display module 151 and thus to form a mutual layer structure, the display module 151 may serve as a touch screen. Thus, the user can enter various information simply by touching the display module 151.

The first audio output module 153*a* may be implemented as a receiver or a speaker. The first camera 121*a* may be configured to be suitable for capturing a still or moving image of the user. The microphone 123 may be configured to properly receive the user's voice or other sounds.

The first through third user input modules 130*a* through 130*c* and fourth and fifth user input modules 130*d* and 130*e* may be collectively referred to as the user input unit 130. The user input unit 130 may adopt various tactile manners as long as it can offer tactile feedback to the user.

For example, the user input unit 130 may be implemented as a dome switch or touch pad capable of receiving a command or information by being pushed or touched by the user; or a wheel, a jog dial or wheel, or a joystick capable of receiving a command or information by being rotated. More specifically, the first user input module 130*a* may be used to enter various commands such as 'start', 'end', and 'scroll' to the mobile terminal 100, the second user input module 130*b* may be used to select an operating mode for the mobile terminal 100, and the third user input module 130*c* may serve as a hot key for activating certain functions of the mobile terminal 100.

When the display module 151 is approached by the user's finger, the proximity sensor 141 may detect the existence of the approaching finger, and may output a proximity signal. The proximity sensor 141 may output different proximity signals according to the distance between the display module 151 and the approaching finger. For a precise detection of the approaching finger, a plurality of proximity sensors 141 having different detection ranges may be employed. In this case, it is possible to precisely determine the distance between the approaching finger and the display module 151 by comparing a plurality of proximity signals respectively provided by the plurality of proximity sensors 141. In addition, it is possible to determine which part of the display module 151 is being approached by the approaching finger and whether the approaching finger is being moved within the close vicinity of the display module 15 by determining which of the plurality of proximity sensors 141 are outputting proximity signals. The controller 180 may identify a touch key, if any, currently being approached by the approaching finger and may then control the haptic module 157 to generate a vibration signal corresponding to the identified touch key.

When the user tilts or shakes the mobile terminal 100, the motion sensor 145 may detect the movement of the mobile terminal 100, and may generate a signal corresponding to the detected movement to the controller 180. The controller 180 may extract various motion information such as the direction, angle, speed and intensity of the movement of the mobile terminal 100 and the location of the mobile terminal 100 from the signal provided by the motion sensor 145.

The controller 180 may keep track of the movement of the mobile terminal 100 based on the extracted motion information. The type of motion information that can be extracted from the signal provided by the motion sensor 145 may vary according to the type of motion sensor 145. Thus, more than one motion sensor 145 capable of providing desired motion information may be employed in the mobile terminal 100. The controller 180 may control the motion sensor 145 to operate only when a predetermined application is executed.

Figure 3:
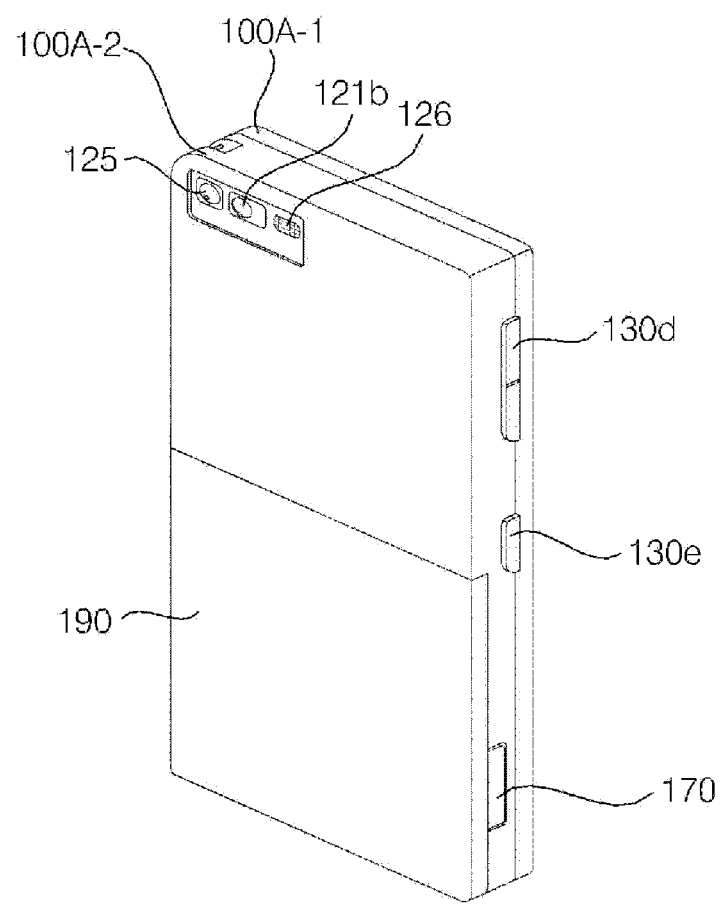
FIG. 3 illustrates a rear perspective view of the mobile terminal shown in FIG. 2.

FIG. 3 illustrates a rear perspective view of the mobile terminal 100. Referring to FIG. 3, the fourth and fifth user input modules 130*d* and 130*e* and the interface unit 170 may be disposed on one side of the rear case 100A-2, and a second camera 121b may be disposed at the back of the rear case 100A-2.

The second camera 121b may have a different photographing direction from that of the first camera 121a shown in FIG. 2. In addition, the first and second cameras 121a and 121b may have different resolutions. For example, the first camera 121a may be used to capture and then transmit an image of the face of the user during a video call. Thus, a low-resolution camera may be used as the first camera 121a. The second camera 121b may be used to capture an image of an ordinary subject. In this case, the image captured by the second camera 121b may not need to be transmitted. Thus, a high-resolution camera may be used as the second camera 121b.

A mirror 125 and a camera flash 126 may be disposed near the second camera 121b. The mirror 125 may be used for the user to prepare him- or herself for taking a self-portrait. The cameral flash 126 may be used to illuminate a subject when the user attempts to capture an image of the subject with the second camera 121b.

A second audio output module (not shown) may be additionally provided in the rear case 100A-2. The second audio output module may realize a stereo function along with the first audio output module 153a. The second audio output module may also be used in a speaker-phone mode.

Not only an antenna (not shown) for making or receiving a call but also an antenna (not shown) for receiving a broadcast signal may be disposed on one side of the rear case 100A-2. The antennas may be installed so as to be able to be retracted from the rear case 100A-2.

The interface unit 170 may serve as a pathway for allowing the mobile terminal 100 to exchange data with an external device. For example, the interface unit 170 may include at least one of a connector for connecting earphones to the mobile terminal wiredly or wirelessly, a port for performing short-range communication, and a power supply port for supplying power to the mobile terminal 100. Alternatively, the interface unit 170 may include a card socket for receiving a SIM card, a UIM card or an exterior card such as a memory card.

The power supply unit 190, which supplies power to the mobile terminal 100, may be disposed in the rear case 100A-2. The power supply unit may be a rechargeable battery and may be coupled to the rear case 100A-2 so as to be attachable to or detachable from the rear case 100A-2.

The second camera 121b and the other elements that have been described as being provided in the rear case 100A-2 may be provided in the front case 100A-1. In addition, the first camera 121a may be configured to be rotatable and thus to cover the photographing direction of the second camera 121b. In this case, the second camera 121b may be optional.

Figure 4:
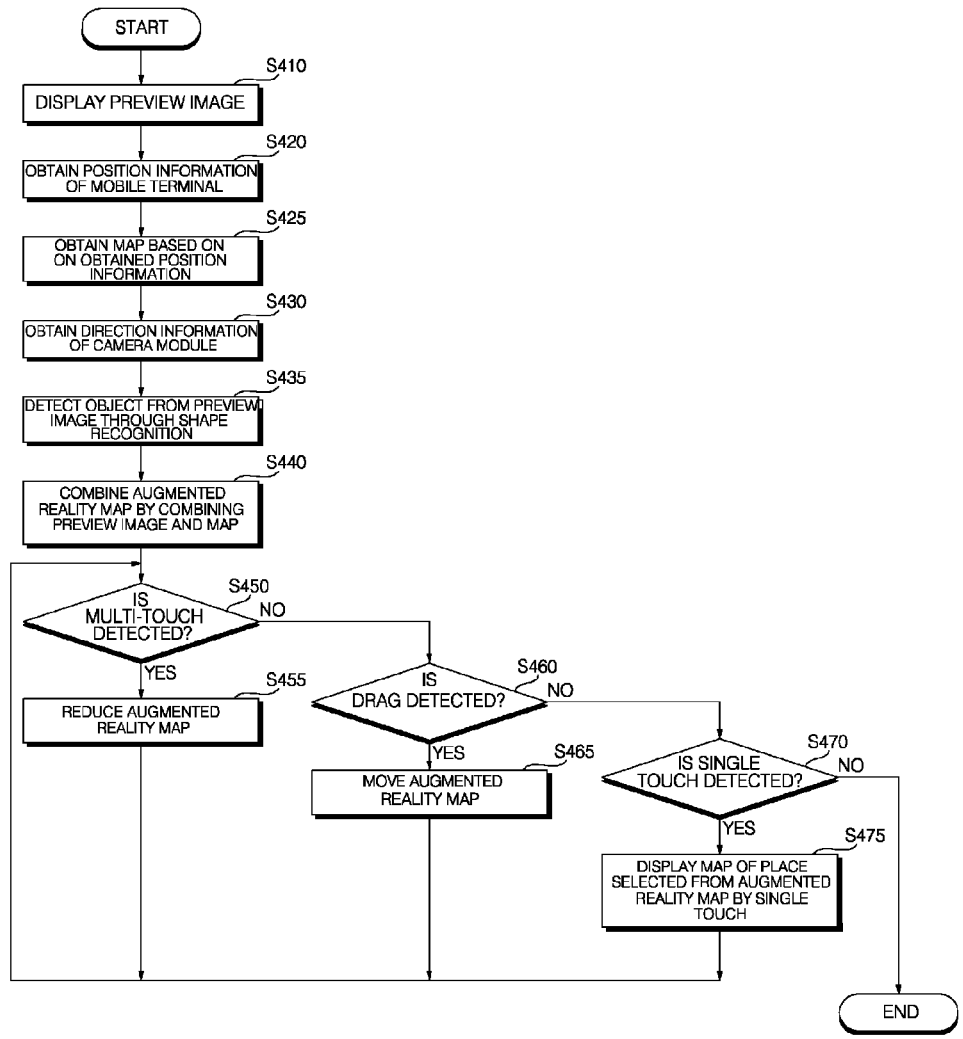
FIG. 4 illustrates a flowchart of an operating method of a mobile terminal, according to an exemplary embodiment of the present invention.

FIG. 4 illustrates a flowchart of an operating method of a mobile terminal, according to an exemplary embodiment of the present invention, and particularly, a method of providing an augmented reality map by combining a preview image and a map. Referring to FIG. 4, during a map mode, a preview image provided by the camera module 121 may be displayed on the display module 151 (S410). More specifically, if the user selects an image capture mode with reference to, for example, the manual of the mobile terminal 100, the preview image, which is provided by the camera module 121 for the purpose of previewing exposure and/or framing before taking a photograph, may be displayed on the display module 151.

Thereafter, the controller 180 may obtain position information of the mobile terminal 100 from, for example, the GPS module 119 (S420). Since the camera module 121 is incorporated into the mobile terminal 100, the position information of the mobile terminal 100 may be considered to be the same as position information of the camera module 121.

GPS information of the mobile terminal 100 may be obtained as the position information of the mobile terminal 100, but the present invention is not restricted to this. That is, the controller 180 may obtain the position information of the mobile terminal 100 using various other methods than using the GPS module 119, for example, using Assisted GPS (A-GPS), which is a system using assistance data available from a network, using a global satellite navigation system such as Galileo or Glonass, using a Wireless Fidelity (Wi-Fi) positioning system (WPS), using cell identification (ID), which is a mobile positioning method using the cell ID of a base station where a mobile terminal bearer belongs, using Bluetooth, and using radio frequency identification (RFID).

If the mobile terminal 100 is located in an outdoor environment, the position information of the mobile terminal 100 can be obtained using the GPS module 119. On the other hand, if the mobile terminal 100 is located in an indoor environment, the position information of the mobile terminal 100 can be obtained using the wireless internet module 115 or the short-range communication module 117.

Thereafter, the controller 180 may obtain a map using the position information of the mobile terminal 100 (S425). More specifically, the controller 180 may read out a map corresponding to the region where the mobile terminal 100 is determined to be located based on the position information of the mobile terminal 100 from a map database present in the memory 160. The read-out map may be a map of an area including the region where the mobile terminal 100 is determined to be located or a map of a region adjacent to the region where the mobile terminal 100 is determined to be located. If no map database is provided in the memory 160, the controller 180 may access an external device having a map database via the wireless communication unit 110 and may thus use the map database of the external device. The map database present in the memory 160 or the map database of the external device may store a number of maps and their respective location information.

In this exemplary embodiment, a map of a region may include various symbols or characters to represent various features in the region or may include various captured images of the features.

Referring back to FIG. 4, the controller 180 may obtain direction information of the camera module 121 (S430). The direction information of the camera module 121 may be obtained using a direction sensor (not shown) attached to the camera module 121, but the present invention is not restricted to this. That is, if the mobile terminal 100 is on the move with the direction of the camera module 121 fixed, the direction information of the camera module 121 may be obtained from the displacement in the position of the mobile terminal 100.

Thereafter, the controller 180 may perform shape recognition and may thus detect an object, if any, from the preview image displayed in operation S410 (S435). There is no restriction to the type of object that that can be subjected to shape recognition. Preferably, objects of a predetermined size or greater, having object information, such as buildings, may be subjected to shape recognition. The object information may be information specifying the name, functions and origin of an object. If an object subjected to shape recognition is a building, the object information may include the name of the building, various services provided in the building and information regarding the providers of the services.

Shape recognition is a method of detecting the shape of an object that can be classified into a predefined model class from a preview image and restoring geometric information of the detected shape. Various shape recognition techniques such as control point detection or shape rendering can be used in operation S435, but the present invention is not restricted to this.

Thereafter, the controller 180 may generate an augmented reality map by combining the map obtained in operation S425 and the preview image displayed in operation S410 based on the position information of the mobile terminal 100, the direction information of the camera module 121 and the results of shape recognition performed in operation S435 (S440). More specifically, the controller 180 may extract a portion of a map of an area displayed in the preview image displayed in operation S410 and its surrounding areas with reference to the position of the mobile terminal 100, the direction information of the camera module 121 and the results of shape recognition performed in operation S435 and may combine the extracted map portion and the preview image displayed in operation S410. The preview image displayed in operation S410 and the map obtained in operation S425 may be geo-referenced to each other in order to be combined seamlessly together.

In this exemplary embodiment, the controller 180 may use all the position information of the mobile terminal 100, the direction information of the camera module 121 and the results of shape recognition performed in operation S435 to combine the preview image displayed in operation S410 and the map obtained in operation S425, but the present invention is not restricted to this. That is, the controller 180 may not necessarily have to use all the position information of the mobile terminal 100, the direction information of the camera module 121 and the results of shape recognition performed in operation S435. Instead, the controller 180 may use at least one of the position information of the mobile terminal 100, the direction information of the camera module 121 and the results of shape recognition performed in operation S435 to combine the preview image displayed in operation S410 and the map obtained in operation S425. However, when using all the position information of the mobile terminal 100, the direction information of the camera module 121 and the results of shape recognition performed in operation S435, it is possible to enhance the precision of the geo-referencing of the preview image displayed in operation S410 and the map obtained in operation S425.

The controller 180 may determine whether a user command for controlling the display of an augmented reality map has been received. The user command for controlling the display of an augmented reality map may be largely classified into one of the following three types: a first user command for enlarging or reducing an augmented reality map; a second user command for moving an augmented reality map; and a third user command for displaying a map of a certain region selected from an augmented reality map.

If the mobile terminal 100 is equipped with a touch screen, the first user command may be generated by a multi-touch on the touch screen, the second user command may be generated by a drag on the touch screen, and the third user command may be generated by a single touch on the touch screen. If multiple touch points are generated on the touch screen at the same time, the controller 180 may determine that a multi-touch-and-drag signal has been received. If a single touch point is generated on the touch point and then a continuous trajectory motion is detected from the single touch point, the controller 180 may determine that a drag signal has been received. If a single touch point is generated on the touch screen without accompanying any continuous trajectory motion therefrom, the controller 180 may determine that a single touch signal has been received. A multi-touch-and-drag signal may be considered to be a type of multi-touch, and this will be described later in further detail.

In this exemplary embodiment, an augmented reality map may be generated before the receipt of an augmented reality map display command, but the present invention is not restricted to this. That is, an augmented reality map may be generated in response to an augmented reality map display command. In this case, operations S420 through S440 may be performed after operation S470.

Referring back to FIG. 4, the controller 180 may determine whether a multi-touch signal has been received (S450). The user may generate a multi-touch signal by touching on the display module 151 with two or more fingers (e.g., a thumb and an index finger) at the same time.

Thereafter, if it is determined in operation S450 that a multi-touch signal has been received, the controller 180 may reduce the augmented reality map generated in operation S440 at a predefined default rate, and may display the reduced augmented reality map on the display module 151 (S455).

In this exemplary embodiment, an augmented reality map may be reduced at a default rate in response to a multi-touch on the display module 151, but the present invention is not restricted to this. For example, if a multi-touch and then a drag on the display module 151 are detected when an augmented reality map is displayed on the display module 151, the rate at which the augmented reality map should be reduced may be determined based on a distance of the drag, and the augmented reality map may be reduced at the determined rate.

The user may input a command to enlarge an augmented reality map as well as a command to reduce an augmented reality map by generating a multi-touch signal. For example, if the user generates a first user command by pinching two fingers closer together, the controller 180 may determine the first user command to be a command to reduce an augmented reality map. On the other hand, if the user generates the first user command by pinching two fingers apart, the controller 180 may determine the first user command to be a command to enlarge an augmented reality map.

The rate at which an augmented reality map is reduced in response to a multi-touch signal may be uniform throughout the whole augmented reality map, or may vary according to a distance from a certain point on the augmented reality map.

The controller 180 may determine whether a drag signal has been received (S460). The user may touch on the display module 151 with a finger and may then drag the finger on the display module 151 in any direction.

Thereafter, if it is determined in operation S460 that a drag signal has been received, the controller 180 may move the augmented reality map generated in operation S440 (S465). The distance by which an augmented reality map is moved in response to a drag may correspond to the distance of the drag, but the present invention is not restricted to this. That is, an augmented reality map may be moved by a predefined default distance regardless of the distance of a drag.

Thereafter, the controller 180 may determine whether a single touch signal has been received (S470). Thereafter, if it is determined in operation S470 that a single touch signal has been received, the controller 180 may display a map of a place selected from the augmented reality map generated in operation S440 by the single touch signal on the display module 151 (S475). The map displayed in operation S475 may not accompany any preview image. The orientation of the map displayed in operation S475 may coincide with the direction information of the camera module 121.

When an augmented reality map including a preview image and a map that are geo-referenced to each other is provided, the user can view both the preview image and the map at the same time and can easily determine his or her location and obtain information regarding his or her location from the augmented reality map. Since the map shows areas that are adjacent to the area displayed in the preview image, the user can easily find a point of interest from the augmented reality map and can easily obtain information regarding the point of interest.

In this exemplary embodiment, a preview image and a map may be geo-referenced to each other, and may be combined together, thereby generating an augmented reality map. However, the present invention is not restricted to this. That is, the controller 180 may reduce the preview image first. Thereafter, the controller 180 may geo-reference the reduced preview image with a corresponding map and may combine the results of geo-referencing, thereby generating an augmented reality map. Alternatively, the controller 180 may perform the displaying and geo-referencing of a preview image and a map at the same time.

Maps may be largely classified into a symbol map, in which symbols and characters are used to represent geographic information, and an image map, in which images are used to represent geographic information, according to how they represent regions, or may be classified into a two-dimensional (2D) map and a three-dimensional (3D) map according to whether they include height information. According to this exemplary embodiment, various types of maps including the above-mentioned ones may be combined with a preview image. More specifically, in order to provide a visual representation of a wide area, a 2D symbol map may be combined with a preview image. On the other hand, in order to provide a detailed visual representation of a small area, a 3D image map may be combined with a preview image. For convenience, the present invention will hereinafter be described in further detail, taking as an example combining a 2D symbol map with a preview image. However, the present invention can also be applied to combining a 3D map or an image map with a preview image.

It will hereinafter be described in further detail how to display a preview image and a map together with reference to FIGS. 5 through 7.

Figure 5:
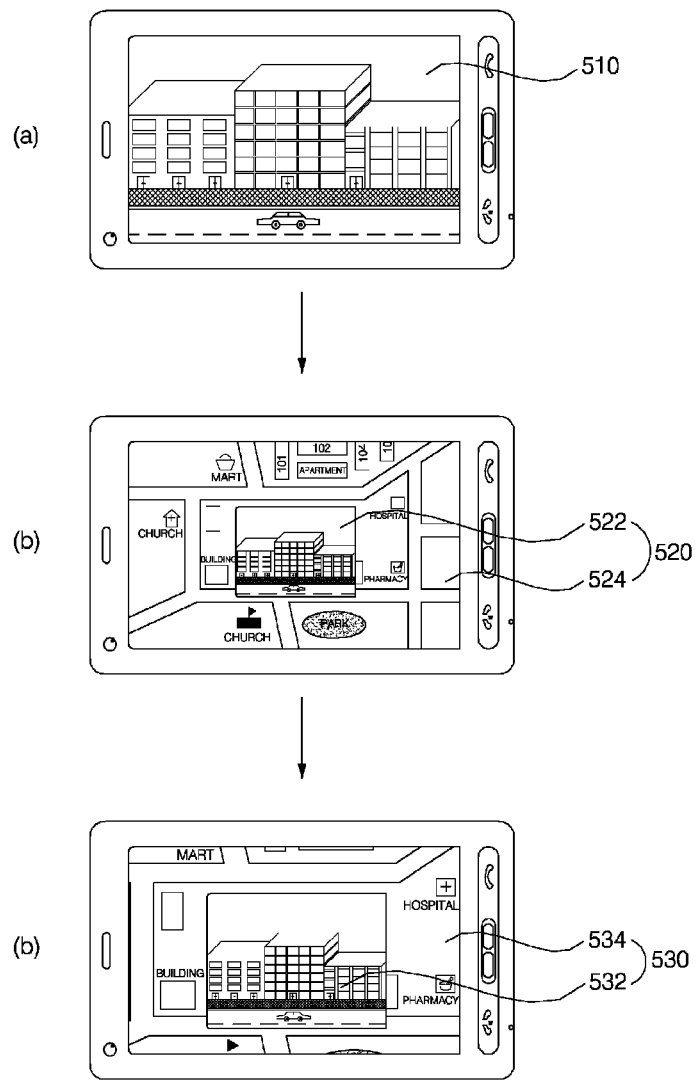
FIG. 5 illustrates diagrams for explaining how to display an augmented reality map and control the display of the augmented reality map in response to a multi-touch.

FIG. 5 illustrates diagrams for explaining how to display an augmented reality map and control the display of the augmented reality map in response to a multi-touch. For convenience, it will hereinafter be assumed that the display module 151 is a touch screen capable of receiving a user command.

Referring to FIGS. 5(a) and 5(b), if the user touches the display module 151 with two fingers and then drags the two fingers closer together when a preview image 510 of a predetermined area or object is displayed on the display module 151, the controller 180 may display a first augmented reality map 520 including a reduced preview image 522, which is obtained by reducing the preview image 510 by an amount corresponding to the distance by which the two fingers are dragged, on the display module 151. In the first augmented reality map 520, the reduced preview image 522 and a map 524 of areas surrounding the area displayed in the reduced preview image 522 may be geo-referenced to each other, and may be combined seamlessly together. The reduced preview image 522 may be displayed at the center of the display module 151.

If the scale of the first augmented reality map 520 is too small to show the neighboring areas, the user may enter a command to enlarge the first augmented reality map 520. For example, referring to FIG. 5(c), if the user touches the display module 151 with two fingers and then drags the two fingers more apart together when the first augmented reality map 520 is displayed on the display module 151, the controller 180 may display a second augmented reality map 530, which is obtained by enlarging the first augmented reality map 520 by an amount corresponding to the distance by which the two fingers are dragged and includes a preview image 532 and a map 534, on the display module 151.

Referring to FIGS. 5(b) and 5(c), the smaller the size of the preview image 522 or 532, the larger the area covered by the map 524 and 534.

Referring to FIGS. 5(a) through 5(c), the rate at which an augmented reality map is reduced or enlarged may be uniform throughout the whole augmented reality map, or may vary according to the distance from a certain point on the augmented reality map. For example, the rate of the preview image in an augmented reality map may become greater from the center of the preview image to the edges of the preview image, and the rate of the map in the augmented reality map is equal to that applied to the edges of the preview image.

Alternatively, the rate of an augmented reality map including a preview image and a map may increase according to the distance from the position of the mobile terminal 100.

When an augmented reality map into which a preview image and a map are combined is displayed, the preview image may not necessarily be displayed at the center of the augmented reality map. The position of the preview image in the augmented reality map may be determined by a drag and drop. For example, if the user touches on the augmented reality map with a thumb and an index finger and then drags and drops the preview image at a lower left corner of the display module 151, the preview image may be displayed at the lower left corner of the display module 151.

Figure 6:
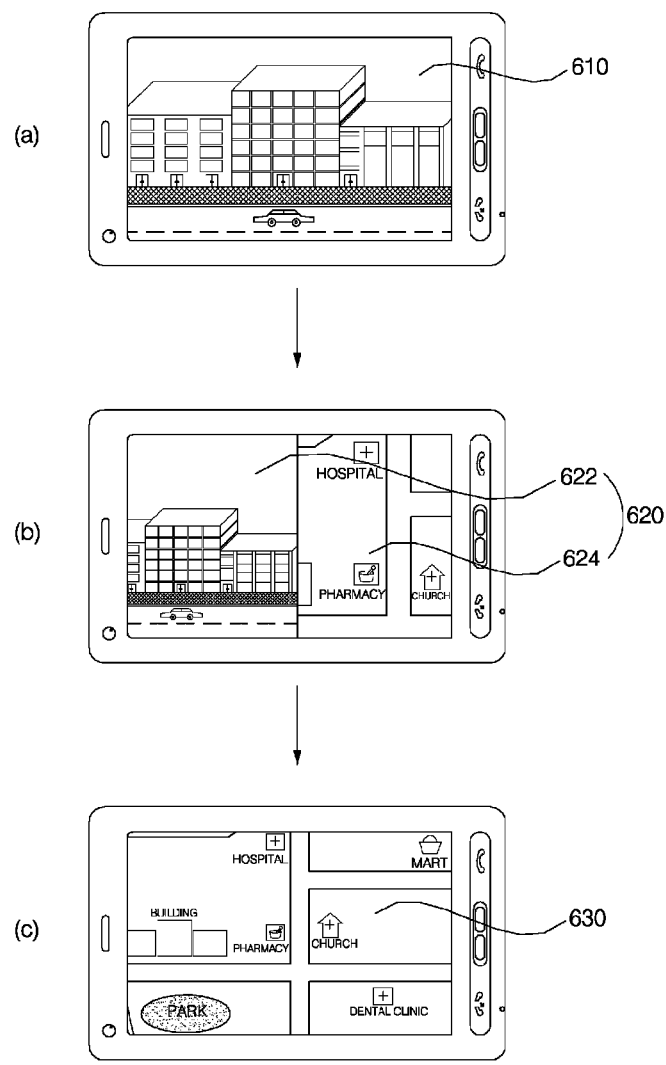
FIG. 6 illustrates diagrams for explaining how to display an augmented reality map and control the display of the augmented reality map in response to a drag.

FIG. 6 illustrates diagrams for explaining how to display an augmented reality map and control the display of the augmented reality map in response to a drag. Referring to FIGS. 6(a) and 6(b), if the user touches on the display module 151 with a finger and then drags the finger to the left when a preview image 610 is displayed on the display module 151, the controller 180 may move the preview image 610 to the left. As a result, a third augmented reality map 620 including a right part of the preview image 610, i.e., a preview image 622, and a map 624 that shows areas surrounding the area or object displayed in the preview image 622 may be displayed on the display module 151. In the third augmented reality map 620, the preview image 622 and the map 624 may be geo-referenced to each other, and may be combined seamlessly together.

Referring to FIGS. 6(b) and 6(c), if the user touches and drags the third augmented reality map 620 to the left, the third augmented reality map 620 may be moved to the left so that only a map portion 630 of the third augmented reality map 620 can appear on the display module 151. In this case, an application for realizing augmented reality may be terminated because the mobile terminal 100 is only required to display a map.

Figure 7:
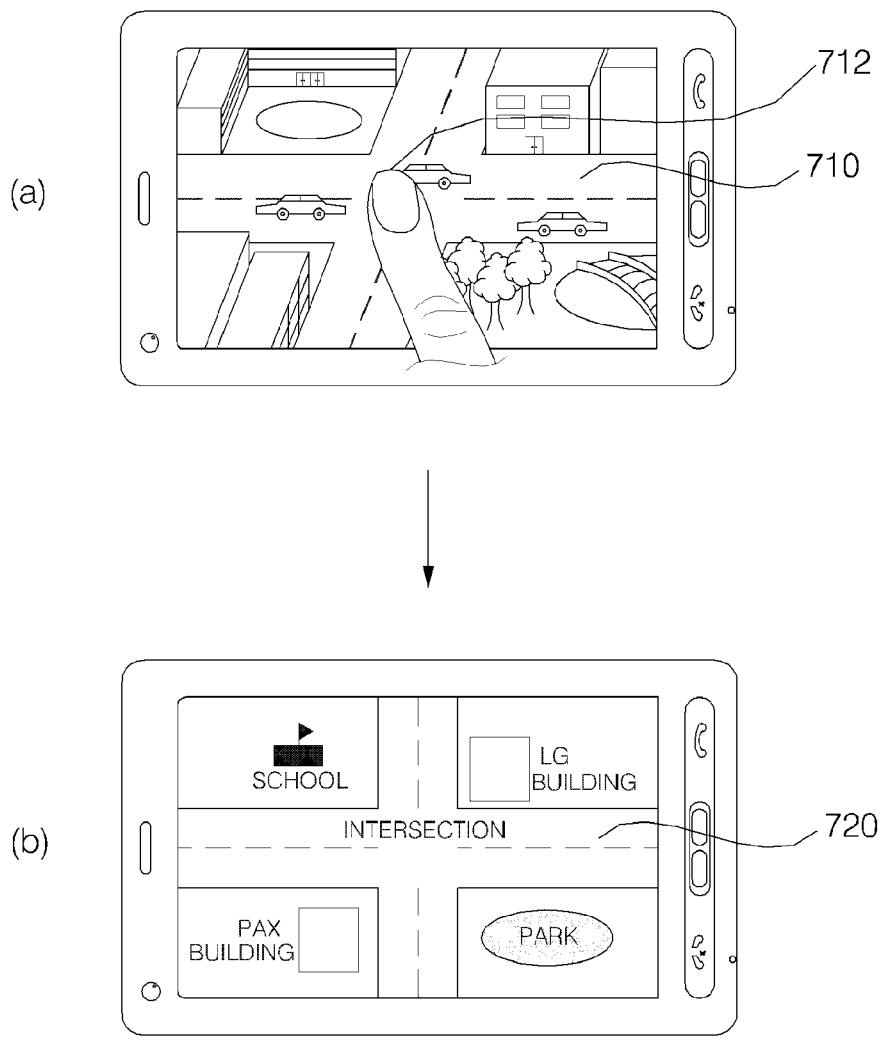
FIG. 7 illustrates diagrams for explaining how to display an augmented reality map and control the display of the augmented reality map in response to a single touch.

FIG. 7 illustrates diagrams for explaining how to display an augmented reality map and control the display of the augmented reality map in response to a single touch. Referring to FIG. 7(a), if the user taps a finger on a portion 712 of a preview image 710, i.e., if the user touches once but not drags the image portion 712, the controller 180 may determine the position of the image portion 712, may withdraw a map 720 of a region including the determined position from the map database present in the memory 160. The map 720 may not be geo-referenced to the preview image 710, but may be considered to be an augmented reality map because it is displayed in response to a command detected from the preview image 710.

In the exemplary embodiment of FIG. 4, a multi-touch, a drag and a single touch can be used, individually or in combination, as a command to display an augmented reality map.

In addition, in the exemplary embodiment of FIG. 4, an augmented reality map may be displayed in response to a touch-based user command detected from a touch screen, but the present invention is not restricted to this. That is, an augmented reality map may be displayed in response to a user command that can be detected by a motion sensor or a camera sensor.

It has been described in detail how to provide a preview image and a map together and thus to provide information regarding a wide area. A method of realizing a temporally-expanded augmented reality by providing a preview image of the reality at a previous time will hereinafter be described in detail.

FIG. 8 illustrates a flowchart of an operating method of a mobile terminal, according to another exemplary embodiment of the present invention, and particularly, how to provide an augmented reality view of the reality at any given time. Referring to FIG. 8, a preview image (hereinafter referred to as the current preview image) provided by the camera module 121 may be displayed on the display module 151 (S810). More specifically, if the user selects an image capture mode with reference to, for example, the manual of the mobile terminal 100, a preview image, which is provided by the camera module 121 for the purpose of previewing exposure and/or framing before taking the photograph, may be displayed on the display module 151.

Thereafter, the controller 180 may perform shape recognition and may thus detect an object, if any, from the current preview image (S820). There is no restriction to the type of object that can be subjected to shape recognition. Preferably, objects of a predetermined size or greater, having object information, such as buildings, may be subjected to shape recognition.

Shape recognition is a method of detecting the shape of an object that can be classified into a predefined model class from a preview image and restoring geometric information of the detected shape. Various shape recognition techniques such as control point detection or shape rendering can be used in operation S435, but the present invention is not restricted to this.

Referring back to FIG. 8, the controller 180 may compare the current preview image with a previous preview image present in the memory 160 and may thus determine whether the current preview image includes a new object that is not displayed in the previous preview image (S830). The previous preview image may be a most recently-captured preview image.

Thereafter, if it is determined in operation S830 that the current preview image includes a new object that is not included in the previous preview image, the controller 180 may obtain position information of the mobile terminal 100 and direction information of the camera module 121 (S840). More specifically, the controller 180 may obtain the position information of the mobile terminal 100 from, for example, the GPS module 119, and the direction information of the camera module 121 from, for example, a direction sensor (not shown) attached to the camera module 121. Since the camera module 121 is incorporated into the mobile terminal 100, the position information of the mobile terminal 100 may be considered to be the same as position information of the camera module 121.

GPS information of the mobile terminal 100 may be obtained as the position information of the mobile terminal 100, but the present invention is not restricted to this. That is, the controller 180 may obtain the position information of the mobile terminal 100 using various other methods than using the GPS module 119, for example, using A-GPS, which is a system using assistance data available from a network, using a global satellite navigation system such as Galileo or Glonass, using a WPS, using cell ID, which is a mobile positioning method using the cell ID of a base station where a mobile terminal bearer belongs, using Bluetooth, and using RFID.

Particularly, if the mobile terminal 100 is located in an outdoor environment, the position information of the mobile terminal 100 may be obtained using the GPS module 119. On the other hand, if the mobile terminal 100 is located in an indoor environment, the position information of the mobile terminal 100 may be obtained using the wireless internet module 115 or the short-range communication module 117.

The direction information of the camera module 121 can also be obtained based on the displacement in the position of the mobile terminal 100 especially when the mobile terminal 100 is on the move with the direction of the camera module 121 fixed.

In this exemplary embodiment, the controller 180 may obtain the position information of the mobile terminal 100 from the wireless communication unit 110 and the direction information of the camera module 121 from the direction sensor attached to the camera module 121, but the present invention is not restricted to this. That is, the user may enter initial position information and initial direction information to the mobile terminal 100 through the user input unit 130. Then, the controller 180 may determine the position and direction of the camera module 121 by comparing the initial position information and the initial direction information with sensing data provided by a gyro sensor of the mobile terminal 100.

Referring back to FIG. 8, the controller 180 may determine whether there is object information of the new object detected from the current preview image in the memory 160 based on the position and direction of the camera module 121 and the results of shape recognition performed in operation S820 (S850). More specifically, the controller 180 may search the object information database of the memory 160 for the object information of the new object detected from the current preview image. If the object information of the new object detected from the current preview image is not present in the memory 160, the mobile terminal 100 may access an external device having its own object information database via the wireless communication unit 110 and may thus search the object information database of the external device for the object information of the new object detected from the current preview image. In the object information database of the external device, object information and position information of each object may be stored in connection with each other.

In this exemplary embodiment, object information of an object may be obtained using the position information and direction information of the camera module 121 and the results of shape recognition performed in operation S820, but the present invention is not restricted to this. That is, the controller 180 may not necessarily have to use all the position information and direction information of the camera module 121 and the results of shape recognition performed in operation S820. Instead, the controller 180 may use at least one of the position information and direction information of the camera module 121 and the results of shape recognition performed in operation S435 to obtain object information of an object.

Referring back to FIG. 8, the controller 180 may display the object information obtained in operation S850 over the current preview image (S860) and may store the resulting preview image in the memory 160 (S870).

In this exemplary embodiment, a current preview image may be compared with a previous preview image, and, if the results of comparison indicate that the current preview image includes a new object that is not included in the previous preview image, the current preview image may be stored in the memory 160. However, the present invention is not restricted to this. That is, the controller 180 may store a preview image whenever a user command is received or at regular intervals of time. Alternatively, the controller 180 may store the current preview image only if the degree to which the current preview image differs from the previous preview image or a reference image is greater than a reference level.

Referring back to FIG. 8, the controller 180 may determine whether a 'playback' command has been received (S880). More specifically, the user may often fail to properly check object information from a preview image due to, for example, a corresponding object moving too fast in the preview image. In this case, the user may enter a command to play a previous preview image, i.e., the playback command, in order to check object information from the previous preview image. The user may simply select a 'playback' icon on the display module 151 or touch and flick on the display module 151 in order to enter the 'playback' command.

If it is determined in operation S880 that the 'playback' command has been received, the controller 180 may read out a most recently-stored preview image from the memory 160, and may display the read-out preview image on the display module (S890).

In this exemplary embodiment, the most recently-stored preview image may be displayed in response to the 'playback' command, but the present invention is not restricted to this. That is, a number of previously-stored preview images beginning with a preview image stored at a certain moment in the past may be sequentially displayed. For example, a progress bar representing an array of previously-stored preview images may be provided. Then, the user may appropriately move the slider in the progress bar and may thus select one of the previously-stored preview images to begin with. Then, a number of previously-stored preview images beginning with the selected preview image may be sequentially displayed.

A whole preview image or only a portion of a preview image may be played back in response to the 'playback' command.

In short, it is possible to store a preview image whenever object information thereof is updated and thus to allow the user to view various preview images from the past whenever necessary.

FIG. 9 illustrates diagrams for explaining how to provide an augmented reality view of the reality at a previous time. For convenience, it will hereinafter be assumed that the display module 151 is a touch screen capable of receiving a user command.

Referring to FIGS. 9(a) and 9(b), when an automobile 922 appears in an area within a preview image 910, a preview image 920 showing the automobile 922 may be displayed on the display module 151. Referring to FIG. 9(c), since a new object, i.e., the automobile 922, is added to the preview image 910, object information 932 regarding the automobile 922 may be withdrawn from an object information database, and a preview image 930 showing the automobile 922 and the object information 932 may be displayed on the display module 151. Referring to FIG. 9(d), when the automobile 922 moves past the area displayed in the preview image 930, a preview image 940 may be displayed on the display module 151.

Referring to FIG. 9(e), if the user enters a 'playback' command by touching one part of the display module 151 and then flicking to the right, the controller 180 may read out a most recently-stored preview image, i.e., the previous preview image 930, from the memory 160 and may display the previous preview image 930 on the display module 151.

In short, if a current preview image differs from a previous preview image due to, for example, the addition of a new object to the current preview image or the deletion of an existing object from the previous preview image, the current preview image may be stored in the memory 160. In this manner, it is possible to provide the user with not only a current augmented reality view but also a previous augmented reality view. In addition, it is possible to maximize the use of the storage capacity of the memory 160 by storing only some augmented reality views that satisfy a certain condition, instead of storing all available augmented reality views.

In addition, it is possible to provide dynamic information to the user by reflecting object information obtained from a preview image of the reality at a previous time in an augmented reality map. For example, it is possible to effectively update a map by reflecting object information obtained from a preview image. Moreover, it is possible to configure a new map based on various preview images stored in the memory 160.

FIG. 10 illustrates diagrams for explaining how to combine an augmented reality view of the reality at a previous time and an augmented reality map. When the user is on the move, carrying the mobile terminal 100, a preview image provided by the camera module 121 may change almost in real time according to the movement of the user. For example, a preview image 1010 may be displayed on the display module 151 at first, as shown in FIG. 10(a). Thereafter, if the user moves from his or her initial location to another location, a preview image 1020 may be displayed, replacing the preview image 1010, as shown in FIG. 10(b). Then, the controller 180 may determine that there is a new object added to the preview image 1020. Thereafter, the controller 180 may obtain object information 1022 regarding the new object, and may update the preview image 1020 by reflecting the object information 1022 in the preview image 1020, as shown in FIG. 10(c). Thereafter, if the user moves again to another location, a preview image 1030 may be displayed, replacing the preview image 1020, as shown in FIG. 10(d). Thereafter, if the user switches the mobile terminal 100 to a map mode and then drags the preview image 1030 to the left, a fourth augmented reality map 1040 including a right part of the preview image 1030 (i.e., a preview image 1042) and a map 1044 of areas surrounding the area displayed in the preview image 1042 may be displayed on the display module 151, as shown in FIG. 10(e). In the fourth augmented reality map 1040, the preview image 1042 and the map 1044 may be geo-referenced to each other, and may be combined seamlessly together.

Since even the object information 1022 is reflected in the fourth augmented reality map 1040, the user can obtain more information from the fourth augmented reality map 1040 than from any of the preview images 1010, 1020, and 1030. In addition, it is possible to determine whether the objects displayed in the fourth augmented reality map 1040 have ever been visited by the user based on whether their respective object information is included in the fourth augmented reality map 1040.

In this manner, it is possible for the user to obtain a considerable amount of information from an augmented reality map to which object information obtained from a preview image of the reality at a previous time is added.

In this exemplary embodiment, augmented reality may be realized on a preview image, but the present invention is not restricted to this. That is, the user may enter a command to store a preview image, change the posture of the mobile terminal 100 and then enter a command to display an augmented reality map geo-referenced by the preview and the map of an area displayed in the preview image and its relevant areas.

The mobile terminal and the operating method thereof according to the present invention are not restricted to the exemplary embodiments set forth herein. Therefore, variations and combinations of the exemplary embodiments set forth herein may fall within the scope of the present invention.

The present invention can be realized as code that can be read by a processor (such as a mobile station modem (MSM)) included in a mobile terminal and that can be written on a computer-readable recording medium. The computer-readable recording medium may be any type of recording device in which data is stored in a computer-readable manner. Examples of the computer-readable recording medium include a ROM, a RAM, a CD-ROM, a magnetic tape, a floppy disc, an optical data storage, and a carrier wave (e.g., data transmission through the internet). The computer-readable recording medium can be distributed over a plurality of computer systems connected to a network so that computer-readable code is written thereto and executed therefrom in a decentralized manner. Functional programs, code, and code segments needed for realizing the present invention can be easily construed by one of ordinary skill in the art.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An operating method of a mobile terminal, the operating method comprising:
    displaying a preview image provided by a camera module on a display module;
    obtaining position information of the mobile terminal;
    obtaining a map of an area relevant to an area displayed in the preview image based on the obtained position information;
    receiving a touch input on the display module while the preview image is being displayed; and
    in response to reception of the touch input, displaying an image into which the preview image and the map are combined on the display module,
    wherein a manner of combining the preview image and the map is varied according to a type of the received touch input.

2. The operating method of claim 1, wherein the areas relevant to the area displayed in the preview image include areas surrounding the area displayed in the preview image.

3. The operating method of claim 1, wherein the image into which the preview image and the map are combined includes an image in which the preview image and the map are geo-referenced to each other.

4. The operating method of claim 1, wherein, when the touch input is a multi touch input, the displaying the image comprises reducing the preview image and the map and displaying the reduced preview image in one region on the display module and displaying the reduced map on the rest of the display module.

5. The operating method of claim 4, wherein the smaller the size of the preview image on the display module, the larger the area covered by the map.

6. The operating method of claim 4, wherein the reducing the preview image comprises gradually increasing a rate at which the preview image is reduced from the center of the preview image to the edges of the preview image and reducing the map at the same rate as that applied to the edges of the preview image.

7. The operating method of claim 4, wherein the reducing the preview image comprises reducing the preview image at a uniform rate.

8. The operating method of claim 1, wherein, when the touch input is a drag input, the displaying the image comprises reducing a portion of the preview image, displaying the reduced preview image portion in one region on the display module and displaying a map of areas relevant to an area displayed in the reduced preview image portion such that the map can be combined seamlessly with the reduced preview image portion.

9. The operating method of claim 1, wherein, when the touch input is a drag input, the displaying the image comprises displaying a portion of the preview image in one region on the display module and displaying a map of areas relevant to an area displayed in the preview image portion on the rest of the display module such that the map can be combined seamlessly with the preview image portion.

10. The operating method of claim 1, wherein the map includes a symbol map, in which symbols or characters are used to represent geographic information of each of the areas displayed in the map, and a captured image of each the areas displayed in the map.

11. The operating method of claim 1, wherein the obtaining the map comprises obtaining the map from a map database based on the position information of the mobile terminal.

12. The operating method of claim 11, wherein the map database is stored in a memory of the mobile terminal or in an external device that can communicate with the mobile terminal.

13. The operating method of claim 1, further comprising:
    performing shape recognition on an object detected from the preview image; and
    combining the preview image and the map based on the position information of the mobile terminal and the results of shape recognition of the object.

14. The operating method of claim 1, further comprising:
    obtaining direction information of the camera module; and
    combining the preview image and the map based on the position information of the mobile terminal and the direction information of the camera module.

15. The operating method of claim 1, further comprising:
    obtaining direction information of the camera module;
    performing shape recognition on an object detected from the preview image; and
    combining the preview image and the map based on the position information of the mobile terminal, the direction information of the camera module and the results of shape recognition of the object.

16. A mobile terminal comprising:
    a camera module;
    a touch screen configured to display a preview image provided by the camera module and receive a touch input;
    a wireless communication unit configured to communicate with an external device; and a controller configured to:
  obtain position information of the mobile terminal,
  obtain a map of an area relevant to an area displayed in the preview image based on the position information of the mobile terminal,
  detect the touch input received on the touch screen while the preview image is being displayed, and
  in response to detection of the touch input, display an image into which the preview image and the map are combined,
  wherein a manner of combining the preview image and the map is varied according to a type of the received touch input.

17. The mobile terminal of claim 16, wherein the areas relevant to the area displayed in the preview image include areas surrounding the area displayed in the preview image.

18. The mobile terminal of claim 16, wherein the image into which the preview image and the map are combined includes an image in which the preview image and the map are geo-referenced to each other.

19. The mobile terminal of claim 16, wherein if a multi-touch input is detected from the touch screen, the controller reduces the preview image and the map and displays the reduced preview image in one region on the display module and displays the reduced map on the rest of the display module.

20. The mobile terminal of claim 16, wherein, if a drag input is detected from the touch screen, the controller displays a portion of the preview image in one region on the display module and displays a map of areas relevant to an area displayed in the preview image portion on the rest of the display module such that the map can be combined seamlessly with the preview image portion.

21. An operating method of a mobile terminal, the operating method comprising:
  displaying a preview image provided by a camera module on a display module;
  obtaining position information of the mobile terminal;
  obtaining a map of an area relevant to an area displayed in the preview image based on the obtained position information;
  receiving a single touch input to the displayed preview image; and
  in response to reception of the single touch input, removing the preview image from the display module and displaying a map image of a place touched by the single touch input on the display module.

* * * * *